(12) United States Patent
Okutomi et al.

(10) Patent No.: US 7,684,156 B2
(45) Date of Patent: Mar. 23, 2010

(54) DISK DRIVE APPARATUS

(75) Inventors: Takeshi Okutomi, Ome (JP); Hideyuki Miyazaki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/249,691

(22) Filed: Oct. 10, 2008

(65) Prior Publication Data

US 2009/0168251 A1 Jul. 2, 2009

(30) Foreign Application Priority Data

Dec. 27, 2007 (JP) ............... 2007-338213

(51) Int. Cl.
*G11B 5/54* (2006.01)

(52) U.S. Cl. .................................. 360/256.2

(58) Field of Classification Search ................. 360/256, 360/256.2, 256.4

See application file for complete search history.

(56) References Cited

U.S. PATENT DOCUMENTS

| | | | |
|---|---|---|---|
| 5,313,354 A | 5/1994 | Sampietro et al. | |
| 5,341,259 A * | 8/1994 | Amirkiai et al. | 360/256.2 |
| 5,731,933 A | 3/1998 | Sonderegger et al. | |
| 6,147,841 A * | 11/2000 | Rao | 360/256.2 |
| 6,381,103 B1 * | 4/2002 | Misso et al. | 360/256.2 |
| 6,442,003 B1 | 8/2002 | Jones et al. | |
| 7,259,938 B2 * | 8/2007 | Lee et al. | 360/256 |
| 7,564,654 B2 * | 7/2009 | Kim et al. | 360/256.4 |
| 2008/0192386 A1 * | 8/2008 | Hwang et al. | 360/256.2 |

FOREIGN PATENT DOCUMENTS

| | | |
|---|---|---|
| JP | 04-109466 | 4/1992 |
| JP | 2521408 | 5/1996 |

* cited by examiner

*Primary Examiner*—Angel A. Castro
(74) *Attorney, Agent, or Firm*—Knobbe, Martens, Olson & Bear LLP

(57) ABSTRACT

According to one embodiment of the invention, a disk drive apparatus includes a case, a disk-shaped recording medium, a drive motor, a head, a head actuator, and a latch mechanism configured to latch the head actuator and hold the head actuator at a retracted position when the head actuator receives an external force. A latch member of the latch mechanism is arranged to be movable between a latch position and a release position and has an abutment portion, which abuts the head actuator when the head actuator moves from the information processing position to the retracted position, and a latch claw which latches the head actuator. The abutment portion has a first abutment portion, which abuts the head actuator first, and a second abutment portion, which abuts the head actuator following the first abutment portion, and the first abutment portion being formed less rigid than the second abutment portion.

10 Claims, 6 Drawing Sheets

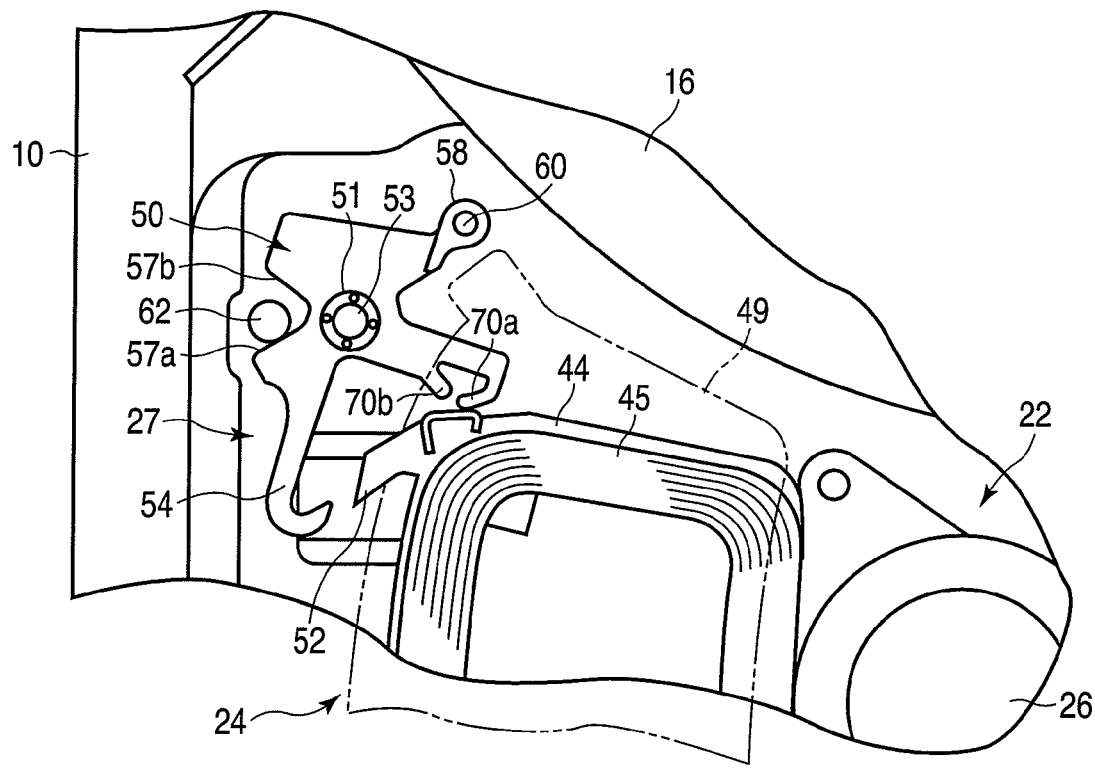
F I G. 4
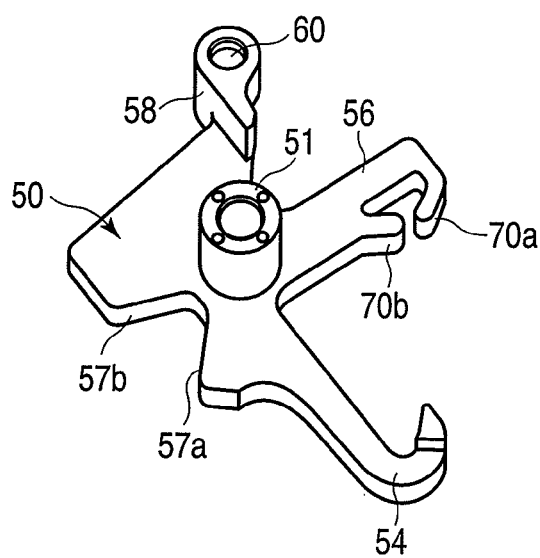
F I G. 5

DISK DRIVE APPARATUS

CROSS-REFERENCE TO RELATED APPLICATIONS

This application is based upon and claims the benefit of priority from Japanese Patent Application No. 2007-338213, filed Dec. 27, 2007, the entire contents of which are incorporated herein by reference.

BACKGROUND

1. Field

One embodiment of the present invention relates to a disk drive apparatus provided with a latch mechanism for a head actuator.

2. Description of the Related Art

Recently, magnetic disk apparatuses, for example, have been widely used as a large capacity disk apparatus in electronic appliances such as a personal computer and the like. In general, the magnetic disk apparatus has a magnetic disk, a spindle motor for supporting and driving by rotating the magnetic disk, a head actuator for supporting a magnetic head, a voice coil motor (hereinafter, referred to as a VCM) for driving the head actuator, a board unit, and the like, and these components are disposed in a case. The VCM is composed of a voice coil mounted on the head actuator, and a pair of yokes and a permanent magnet attached to a case side.

Further, recently, mobile compact personal computers are becoming widespread, and a magnetic disk apparatus mounted on this type of a personal computer is required to improve resistance to a shock and the like produced when it is carried.

To satisfy the requirement, there is proposed a magnetic disk apparatus provided with a ramp load mechanism for holding a magnetic head at a predetermined position when the magnetic disk apparatus is out of operation. The ramp load mechanism has a ramp provided at the outside of a magnetic disk, and when the magnetic disk apparatus is out of operation, a head actuator is pivoted to a retracted position located in the outer periphery of the magnetic disk, and a suspension rides on the ramp. With this operation, since the magnetic head is held at the retracted position away from the surface of the magnetic disk, when the magnetic head receives a shock, it is prevented from colliding with the magnetic disk.

Further, for example, Japanese Patent No. 2521408 discloses a magnetic disk apparatus provided with a latch mechanism for more improving resistance to shock as this type of the magnetic disk apparatus. When a shock is applied to the magnetic disk apparatus when it is out of operation, the latch mechanism is engaged with a head actuator and regulates that the head actuator is pivoted and holds the head actuator at a retracted position.

The latch mechanism includes a latch member which is movable between a latch position at which it can be engaged with the head actuator and a release position at which the latch mechanism can be released. When the head actuator moves to the retracted position, the latch member moves from the release position to the latch position by being pressed by the head actuator and is held at the latch position. With this operation, when a shock is applied to the magnetic disk apparatus, the latch member engages with the head actuator and regulates that the head actuator is pivoted and holds the head actuator at the retracted position.

In the latch mechanism arranged as described above, when the head actuator moves to the retracted position and collides with the latch member or when the latch member moves from a latch release position to the latch position and abuts a stop, a shock and contact noise are produced. If the shock and the contact noise are frequently produced, a user may feel concerned.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an exemplary plan view showing a latch mechanism of the HDD;

FIG. 5 is an exemplary perspective view showing a stop latch of the latch mechanism;

DETAILED DESCRIPTION

Figure 1:
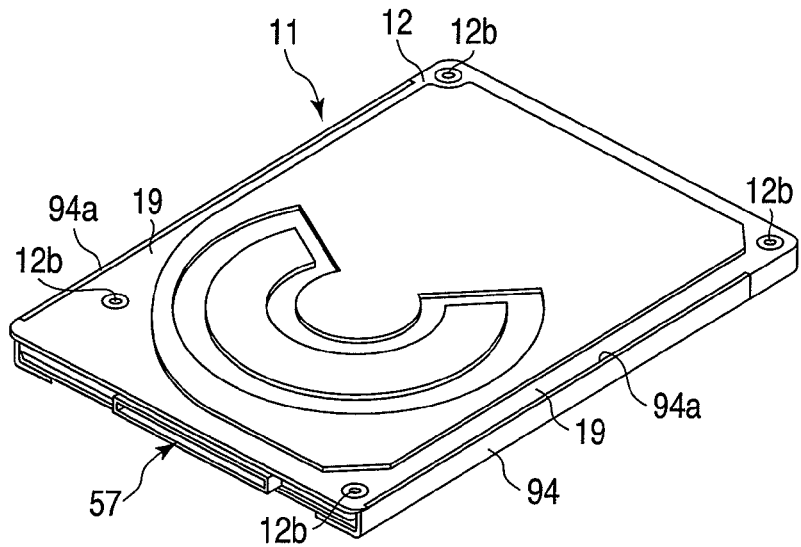
FIG. 1 is an exemplary perspective view showing an HDD according to a first embodiment of the invention.

Various embodiments according to the invention will be described hereinafter with reference to the accompanying drawings. In general, according to one embodiment of the invention, there is provided comprising: a case having a bottom wall; a disk-shaped recording medium arranged in the case; a drive motor which is arranged in the case and supports and rotates the recording medium; a head which performs information processing to the recording medium; a head actuator which is disposed on the bottom wall in the case and supports the head to be movable with respect to the recording medium and is movable between a predetermined retracted position wherein the head is located on an outer periphery side of the recording medium and to an information processing position wherein the head is located on the recording medium; and a latch mechanism configured to latch the head actuator and hold the head actuator at the retracted position when the head actuator receives an external force in the state that the head actuator has moved to the retracted position, the latch mechanism including a latch member which is arranged to be movable between a latch position wherein the latch member is capable of latching the head actuator and a release position wherein the latch member releases the latched head actuator and has an abutment portion, which abuts the head actuator when the head actuator moves from the information processing position to the retracted position, and a latch claw which latches the head actuator, and the abutment portion having a first abutment portion, which abuts the head actuator first, and a second abutment portion, which abuts the head actuator following the first abutment portion, and the first abutment portion being formed less rigid than the second abutment portion.

A hard disk drive (hereinafter, referred to as HDD) according to a first embodiment of the invention will be explained in detail referring to the drawings.

Figure 2:
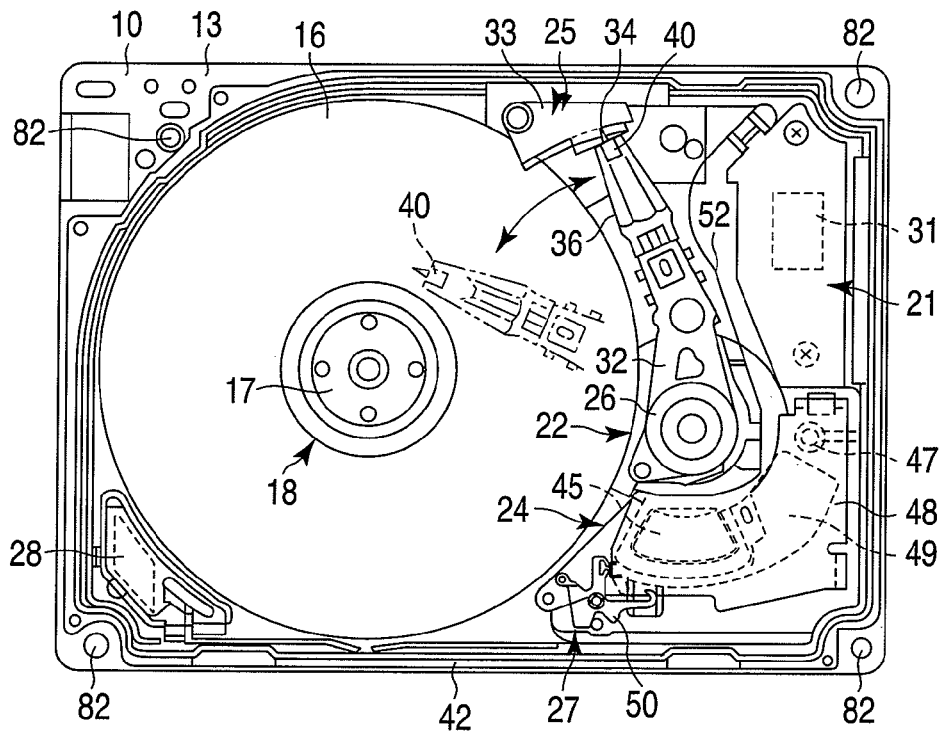
FIG. 2 is an exemplary plan view showing an internal structure of the HDD by removing a top cover therefrom.
Figure 3:
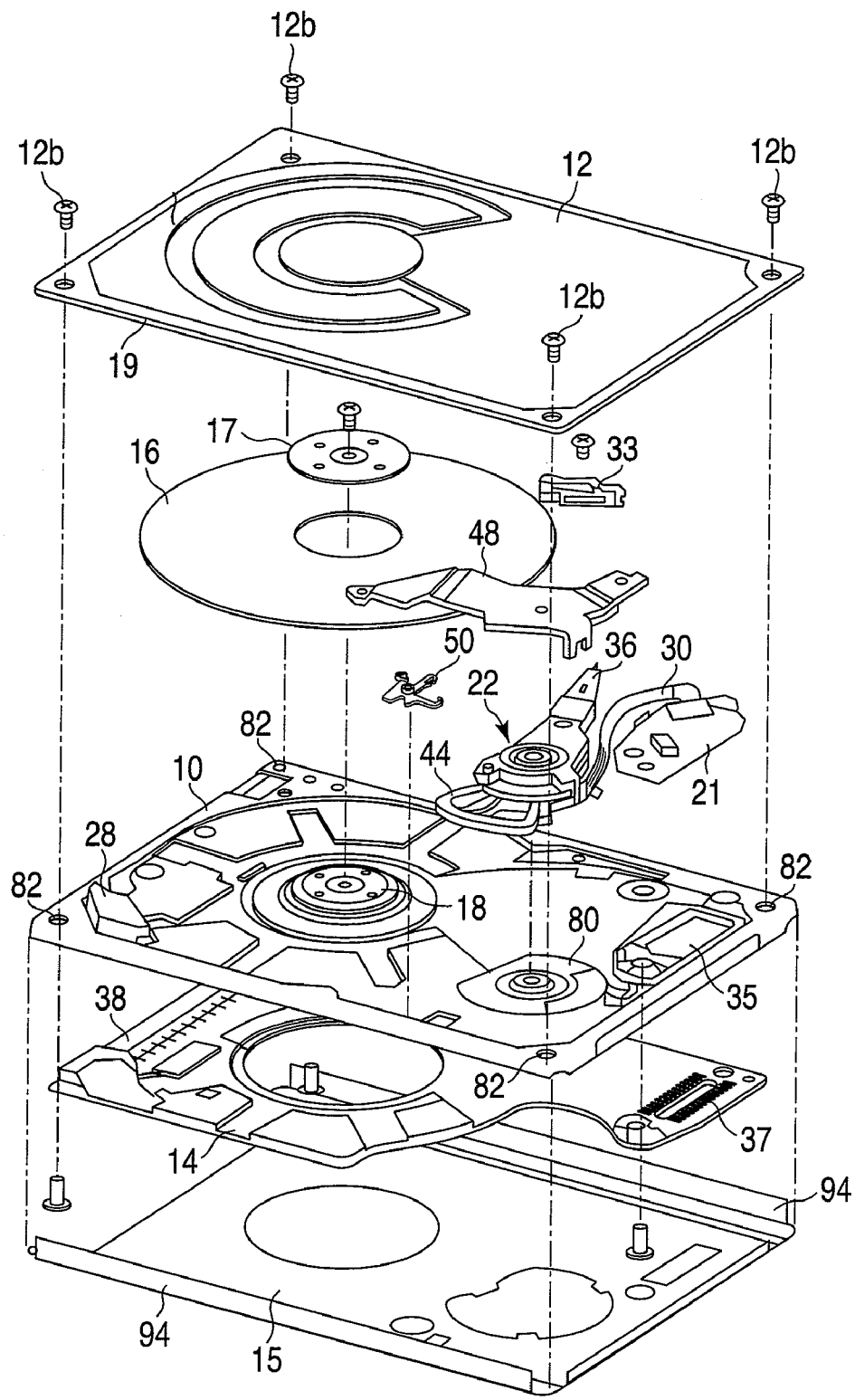
FIG. 3 is an exemplary exploded perspective view of the HDD.

FIG. 1 shows the HDD in its entirety when it is viewed from a top cover side, FIG. 2 is a plan view showing the internal structure of the HDD by removing the top cover, and FIG. 3 is an exploded perspective view of the HDD. As shown in FIGS. 1 to 3, the HDD is formed in a card shape and arranged according to, for example, PC Card Standard. The HDD has a rectangular sheet-shaped base 10 which has a recessed portion excluding a periphery in which various components to be described later are mounted, and the upper surface side thereof is opened. The HDD includes a plate-shaped top cover 12 for closing the upper surface opening of the base 10, a printed circuit substrate 14 disposed on the back surface side of the base 10, and a bottom cover 15 for covering the printed circuit substrate and the back surface side of the base, and the HDD is formed in a card shape in its entirety by laminating them. The base 10, the top cover 12, and the bottom cover 15 constitute a flat rectangular case 11.

As shown in FIGS. 2 and 3, a magnetic disk 16, which acts as an information recording medium and has a diameter of 1.8 inch, and a mechanical unit, for example, are disposed on the base 10. The mechanical unit includes a spindle motor 18 as a drive motor for supporting and rotating the magnetic disk 16, a plurality of magnetic heads 40 for writing and reading out information to and from the magnetic disk 16, a head actuator 22 for movably supporting these magnetic heads with respect to the magnetic disk 16, a voice coil motor (hereinafter, referred to as VCM) 24 for pivoting and positioning the head actuator 22, a ramp load mechanism 25 for holding the magnetic head at a position away from the magnetic disk when the magnetic head moves to the outermost periphery of the magnetic disk, and a latch mechanism 27 for holding the head actuator at a retracted position when a shock is applied. A board unit 21 having a head IC and the like and a pack-shaped air filter 28 are disposed on the base 10.

The base 10 is formed by press-molding a soft magnetic material, for example, an iron material such as a cold-rolled carbon steel sheet (SPCC) and the like, and an approximately flat butting portion 13 is formed around the peripheral edge thereof. The butting portion 13 of the base 10 is formed with a plurality of screw holes 82 for screwing the top cover 12 and positioning holes for positioning a gasket (not shown).

An approximately circular recessed portion 80 is formed on the bottom surface of the base 10 to mount a bearing assembly of the head actuator 22 to be described later. The spindle motor 18 is mounted in the recessed portion of the base 10. The magnetic disk 16 is coaxially fitted with the upper end portion of a hub of the spindle motor 18 and held by a clamp spring 17. The magnetic disk 16 is rotated by the spindle motor 18 at a predetermined speed.

The head actuator 22 has a bearing assembly 26 fixed to the recessed portion 80 of the base 10, two arms 32 extending from the bearing assembly, magnetic head assemblies 36 extending from the distal ends of the respective arms, and a support frame 44 extending from the bearing assembly in a direction opposite to the arms 32 as well as supporting the voice coil. The respective magnetic head assemblies 36 have slender sheet-shaped suspensions and the magnetic heads 40 fixed to the distal ends of the suspensions through gimbals (not shown).

The magnetic disk 16 is located between the two arms 32 in the state that the head actuator 22 is assembled to the base 10. The pair of magnetic heads 40 confronts the upper surface and the lower surface of the magnetic disk 16, respectively. A predetermined head load is applied to the respective magnetic heads 40 toward the surface of the magnetic disk by the spring force of the suspensions.

As shown in FIGS. 2 to 4, the VCM 24 for pivoting the head actuator 22 includes a voice coil 45 fixed to the support frame 44 of the head actuator, an upper yoke 48 disposed on the base 10 in confrontation with the voice coil, and a magnet 49 fixed on the inner surface of the upper yoke in confrontation with the voice coil. The base 10 formed of a magnetic material acts also as a lower yoke of the VCM 24.

When power is supplied to the voice coil 45, the head actuator 22 is pivoted between the retracted position, which is shown by a solid line in FIG. 3 and at which the magnetic heads 40 are located away from the outer periphery of the magnetic disk 16, and an information processing position, which is shown by a two-dot-and-dashed-line in FIG. 3 and at which the magnetic heads are located on the magnetic disk. The magnetic heads 40 are located on a desired track of the magnetic disk 16 at the information processing position. The head actuator 22 is regulated from being excessively pivoted in the center direction of the magnetic disk 16 by a stop pin 47 standing on the base 10.

As shown in FIGS. 2 and 3, the ramp load mechanism 25 includes a ramp member 33, which is fixed on the inner surface of the bottom wall of the base 10 and confronts the peripheral edge of the magnetic disk 16, and tabs 34 extending from the extreme ends of the suspensions. When the head actuator 22 is pivoted from the inner peripheral portion of the magnetic disk 16 to the retracted position in the outer periphery of the magnetic disk, the tabs 34 are engaged with a ramp of the ramp member 33 and thereafter pulled up by an inclining ramp surface to thereby unload the magnetic heads 40. When the head actuator 22 is pivoted to the retracted position, the tabs 34 are supported on the ramp surface of the ramp member 33, and the magnetic heads 40 are held in the state that they are away from the surfaces of the magnetic disk 16.

As shown in FIGS. 2 and 3, the respective magnetic heads 40 are electrically connected to the board unit 21 through a flexible cable 30. The board unit 21 is formed of a flexible printed circuit substrate, and a connector 31 is mounted on the bottom surface thereof so that it is connected to a printed circuit substrate 14. The board unit 21 is fixed to the base 10 by a screw, and the connector 31 confronts a rectangular signal line insertion opening 35 formed in the base 10.

The printed circuit substrate 14 disposed in the back surface side of the base 10 is formed in a rectangle shape having a size slightly smaller than that of the base 10. A plurality of electronic parts including a connector 37 are mounted on one surface of the printed circuit substrate 14. The connector 37 is connected to the connector 31 disposed to the board unit 21 in the base through the signal line insertion opening 35 of the base 10. An interface connector 38 as an electronic part is mounted on one end of the printed circuit substrate 14 to connect the HDD to external equipment.

As shown in FIGS. 2 to 5, the latch mechanism 27 has a plate-shaped stop latch 50, which is arranged on the bottom wall of the base 10 in the vicinity of the support frame 44 of the head actuator 22, and an engaging claw 52 projecting from the support frame 44 of the head actuator 22. The stop latch 50 acting as a latch member has a support portion 51 in a central portion thereof, and the support portion 51 is rotatably supported on the base 10 by a pivot 53. The stop latch 50 has a latch claw 54 extending from the support portion 51 and capable of being engaged with the engaging claw 52 of the support frame 44, an engaging arm portion 56 extending from the support portion in a direction approximately orthogonal to the latch claw 54, first and second locking surfaces 57a, 57b formed of recessed portions, and a magnetic attraction portion 58 located away from the support portion 51, and these components are molded integrally of, for example, a synthetic resin.

The magnetic attraction portion 58 is disposed on a side opposite to the latch claw 54 across the support portion 51, and an attraction member 60 composed of a magnetic material such as stainless steel is embedded in the magnetic attraction portion 58. The magnetic attraction portion 58 is magnetically attracted by the magnet 49 of the VCM 24.

Horn-shaped first and second projections 70a, 70b, which extend from the engaging arm portion to the head actuator 22 side, are formed integrally in the extending ends of the engaging arm portion 56, respectively. The first and second projections 70a, 70b constitute first and second abutment portions which can abut the support frame 44 of the head actuator 22 when the head actuator 22 is pivoted from an information processing position to a retracted position.

The first and second projections 70a, 70b are formed at positions and in shapes such that when the head actuator 22 is pivoted from the information processing position to the retracted position, the first projection 70a abuts the support frame 44 first and subsequently the second projection 70b abuts the support frame 44. Further, the first projection 70a is formed less rigid than the second projection 70b. In this embodiment, the first projection 70a is formed to have a wall thickness smaller than that of the second projection 70b and further to have a projecting length longer than that of the second projection 70b. With this arrangement, the first projection 70a is made more flexible and more elastically deformable than the second projection 70b.

A stop pin 62 stands on the bottom wall of the base 10. The stop pin 62 is located at a position where it can confront the first and second locking surfaces 57a, 57b of the stop latch 50 and can abut the first and second locking surfaces.

When the HDD receives an external force such as a shock and the like, the latch mechanism 27 latches the head actuator 22 which has moved to the retracted position to prevent the head actuator from moving from the retracted position to the information processing position. That is, as shown in FIG. 4, when the HDD performs an information processing operation, the head actuator 22 is pivoted to the information processing position, and the magnetic heads 40 perform information processing to the magnetic disk 16. At this time, since the magnetic attraction portion 58 is magnetically attracted by the magnet 49 of the VCM 24, the stop latch 50 of the latch mechanism 27 is pivoted clockwise around the pivot 53 and held at an illustrated release position where the first locking surface 57a abuts the stop pin 62. At the release position, the latch claw 54 of the stop latch 50 is separated from the engaging claw 52 formed in the support frame 44 as well as being located at a position away from the moving path of the engaging claw 52 to thereby allow the head actuator 22 to perform a pivot operation.

Figure 6:
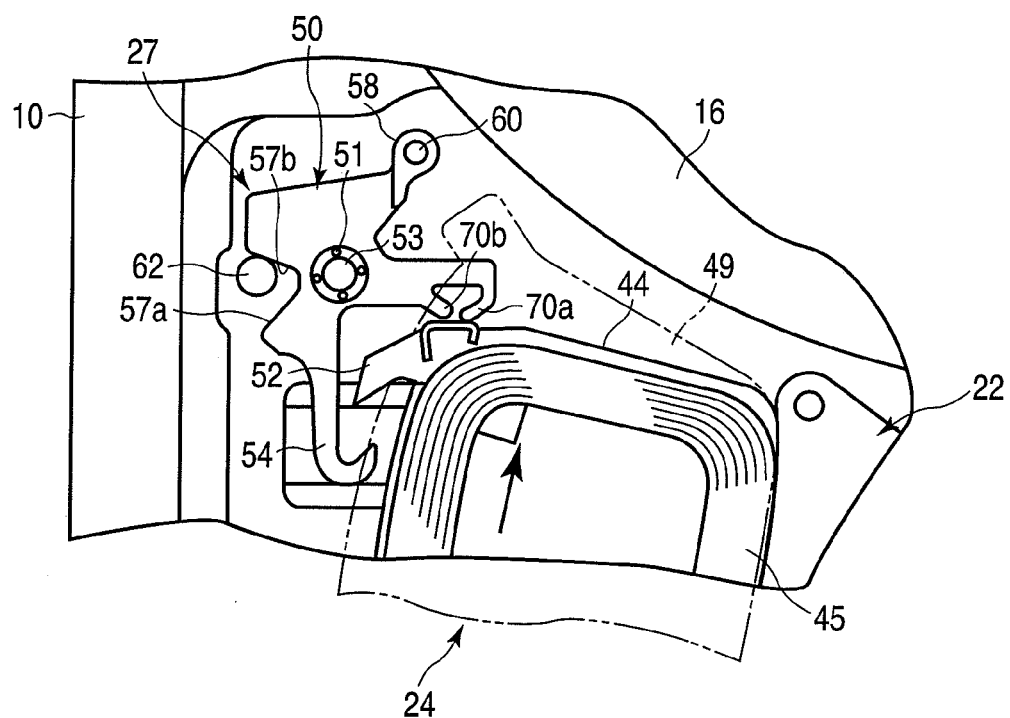
FIG. 6 is an exemplary plan view showing the latch mechanism in a state that the stop latch has moved to a latch position.

When the head actuator 22 is pivoted from the information processing position to the retracted position at the time the operation of the HDD is stopped, the support frame 44 of the head actuator abuts the first projection 70a of the stop latch 50 first and presses the first projection 70a as shown in FIG. 4. With this operation, the stop latch 50 is pivoted counterclockwise around the pivot 53 until the second locking surface 57b abuts the stop pin 62 as shown in FIG. 6. At this time, the first projection 70a, which abuts the support frame 44, is elastically deformed and flexed to thereby absorb a shock force and reduce collision noise and contact noise. When the head actuator 22 is further pivoted toward the retracted position, the support frame 44 abuts the second projection 70b following the first projection 70a, thereby the shock force is further absorbed and the contact noise is further relaxed by the abutment operation performed twice. Since the wall thickness of the second projection 70b, which abuts at the second time, is larger than that of the first projection 70a abutted at the first time, it is elastically deformed in an amount smaller than that of the first projection 70a so that it is not further flexed.

With this operation, the stop latch 50 is pivoted counterclockwise against the magnetic attraction force of the magnetic attraction portion 58 and moved to an illustrated latch position where the second locking surface 57b abuts the stop pin 62. After the stop latch 50 abuts the stop pin 62, the first projection 70a, which is elastically deformed, returns to an original non-deformed state and slightly pivots the head actuator 22. With this operation, the stop latch 50 is held at the latch position in the state that the first projection 70a is in contact with the support frame 44. In the state that the stop latch 50 is held at the latch position, the latch claw 54 is located in the moving path of the engaging claw 52 in the vicinity of the engaging claw 52 of the support frame 44 and can latch the engaging claw 52.

When a large external force acts on the HDD and the head actuator 22 intends to abruptly pivot from the retracted position toward a direction in which the information processing is performed in the state that the head actuator 22 moves to the retracted position and the stop latch 50 is held at the latch position as described above, the engaging claw 52 of the support frame 44 is latched by the latch claw 54 of the stop latch 50 at the time the head actuator 22 slightly pivots. Accordingly, since the pivot operation of the head actuator 22 is regulated by the latch claw 54, the head actuator 22 is held at the retracted position.

As described above, even if the external force such as a shock acts on the HDD, an unintentional movement of the head actuator 22 is regulated by the latch mechanism 27 so that a disadvantage that the magnetic heads are collided against the magnetic disk 16 and damaged can be prevented.

As shown in FIGS. 1 and 3, the upper surface of the base 10, on which the various components are mounted, is closed by the top cover 12 which is fixed to the butting portion 13 of the base 10 by a plurality of screws 12b. A gasket 42 is clamped between the butting portion 13 of the base 10 and a peripheral edge 19 of the top cover 12 to keep the air tightness in the base 10.

The back surfaces of the base 10 and the printed circuit substrate 14 are covered with the bottom cover 15. The bottom cover 15 has an approximately rectangular shape corresponding to the base 10. Sidewalls 94 are formed in the respective long sides of the bottom cover 15 integrally therewith. The respective sidewalls 94 extend vertically with respect to the bottom cover 15, and the extending end 94a of each of the sidewalls 94 is bent at a right angle toward other sidewall 94. With this arrangement, the respective sidewalls 94 cover the side edges of the base 10 and the top cover 12 from the outside.

According to the HDD arranged as described above, provision of the latch mechanism prevents the unintentional movement of the head actuator 22 even if the external force such as the shock acts on the HDD, thereby the disadvantage that the magnetic heads are collided against the magnetic disk 16 and damaged can be prevented. Further, since the abutment portions of the stop latches abutting the head actuator 22 are composed of the first projection having low rigidity and the second projection having high rigidity, when the head actuator abuts the stop latch, a shock can be absorbed and collision noise and contact noise can be suppressed. Accordingly, a user is not made concerned by shock noise and contact noise, thereby the reliability of the HDD can be improved.

Note that, in the first embodiment, it is sufficient that the first projection 70a of the stop latch 50 is less rigid than that of the second projection 70b, and the first projection 70a may be formed to have the same projecting length as that of the second projection 70b. Further, the first projection 70a may be formed to have a projecting length longer than that of the second projection 70b and to have the same wall thickness as that of the second projection 70b. Further, the first and second projections 70a, 70b may be formed of a material having different hardness, for example, the first projection 70a may be formed of a material softer than the material of the second projection 70b so that the first projection 70a is less rigid than the second projection 70b.

Figure 7:
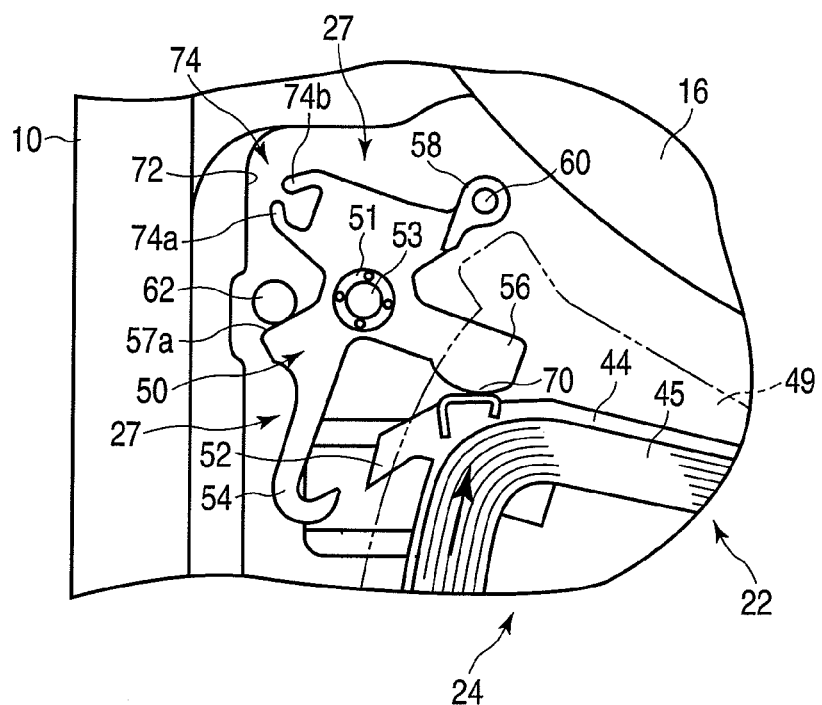
FIG. 7 is an exemplary plan view showing a latch mechanism of an HDD according to a second embodiment of the present invention.
Figure 8:
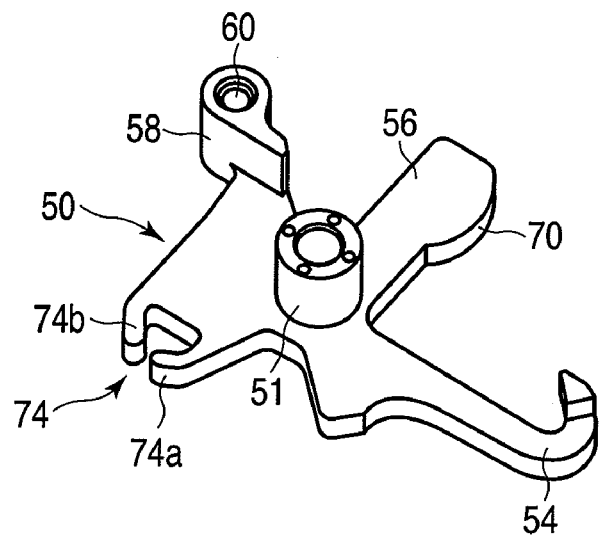
FIG. 8 is an exemplary perspective view showing a stop latch of the latch mechanism.
Figure 9:
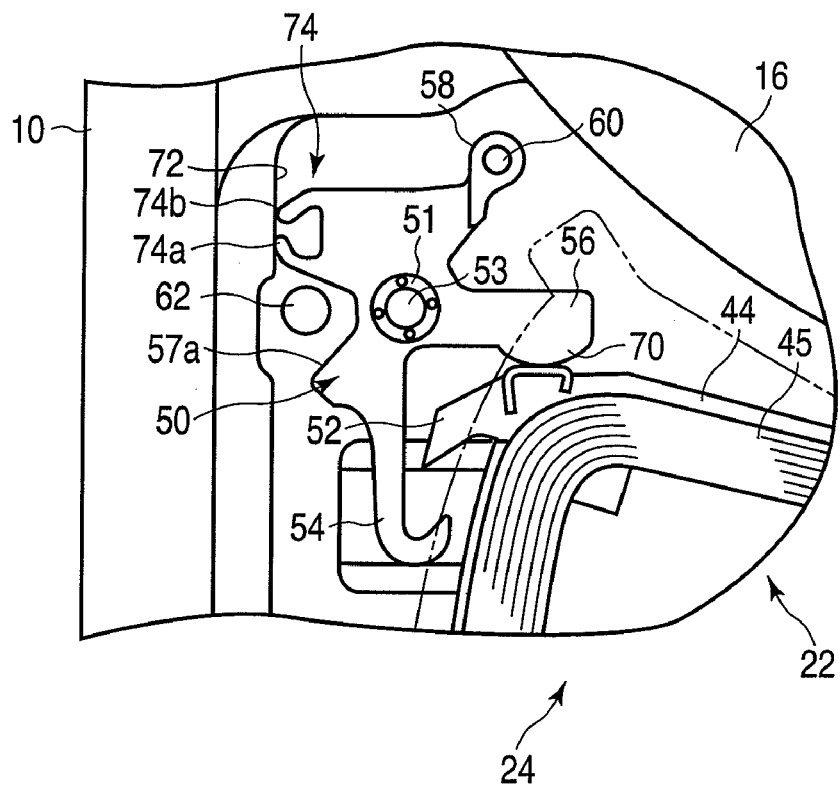
FIG. 9 is an exemplary plan view showing the latch mechanism in a state that the stop latch has moved to a latch position.
Figure 10:
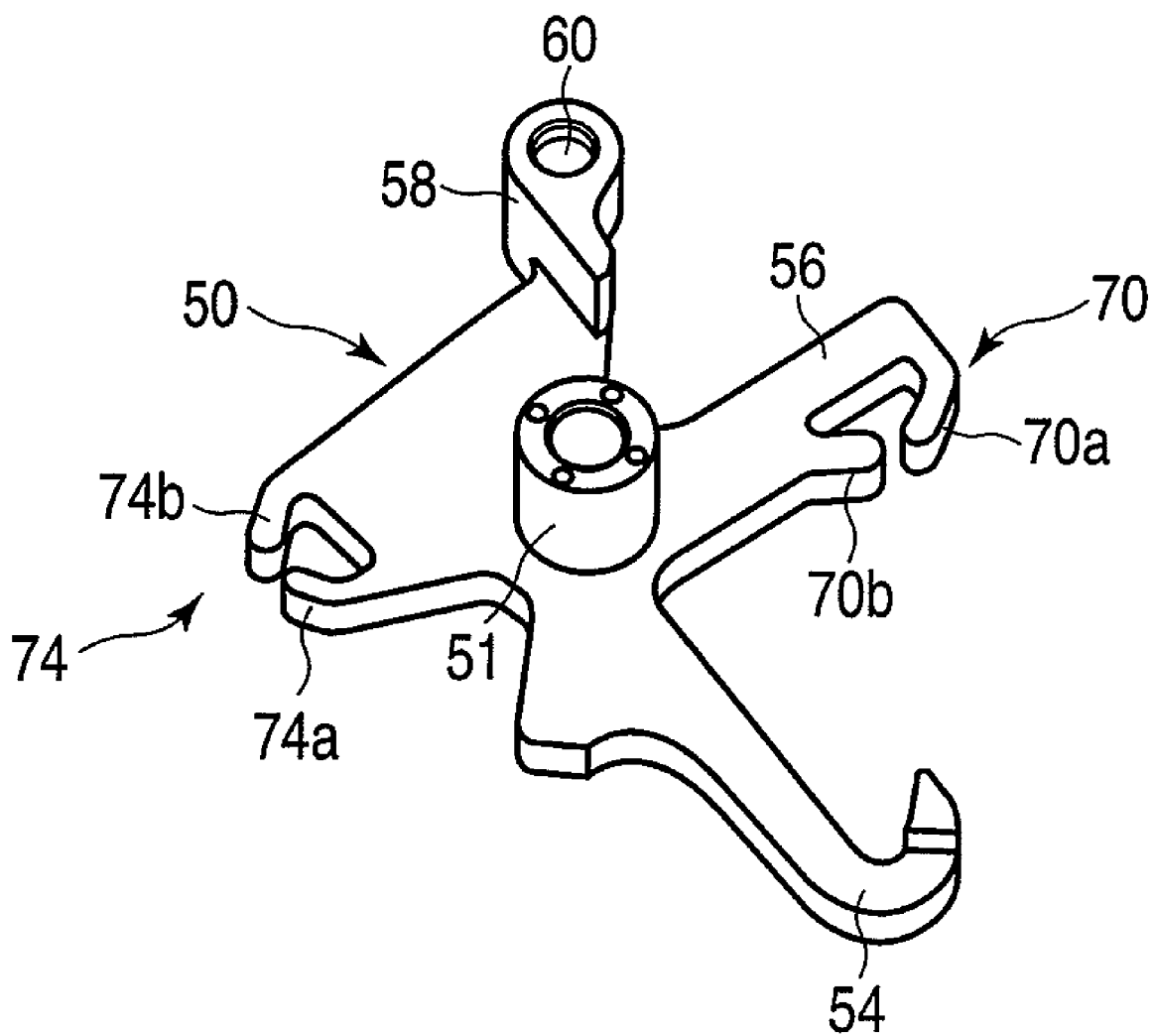
FIG. 10 is an exemplary perspective view showing a stop latch according to a modification.

Next, an HDD according to a second embodiment of the invention will be explained. FIGS. 7, 8, and 9 show a latch mechanism of the HDD according to the second embodiment. As shown in FIGS. 7 and 8, according to the second embodiment, a stop latch 50 of a latch mechanism 27 has a support portion 51 in a central portion thereof, and the support portion 51 is pivotably supported by a pivot 53 on a base 10. The stop latch 50 has a latch claw 54 extending from the support portion 51 and capable of being engaged with an engaging claw 52 of a support frame 44, an engaging arm portion 56 extending from the support portion in a direction approximately orthogonal to the latch claw 54, a first locking surface 57a formed of a recessed portion, and a magnetic attraction portion 58 located away from the support portion 51, and these components are molded integrally of, for example, a synthetic resin. An arc-shaped abutment portion 70, which abuts the support frame 44 of the head actuator 22, is formed in the extending end of the engaging arm portion 56. The magnetic attraction portion 58 is disposed on a side opposite to the latch claw 54 across the support portion 51, and an attraction member 60 composed of a magnetic material such as stainless steel is embedded in the magnetic attraction portion 58. The magnetic attraction portion 58 is magnetically attracted by a magnet 49 of a VCM 24.

The stop latch 50 has a stop abutment portion 74 which abuts a stop surface 72 formed on the base 10 when the stop latch 50 is pivoted to a latch position. The stop abutment portion 74 has horn-shaped first and second projections 74a, 74b extending from the stop latch 50 to the stop surface 72. The first and second projections 74a, 74b constitute the first and second abutment portions which abut the stop surface 72 when the stop latch 50 is pivoted from a release position to the latch position.

The first and second projections 74a, 74b are formed at positions and in shapes such that when the stop latch 50 is pivoted from the release position to the latch position, the first projection 74a abuts the stop surface 72 first and subsequently the second projection 74b abuts the stop surface 72. Further, the first projection 74a is formed less rigid than the second projection 74b. Here, the first projection 74a is formed to have a wall thickness smaller than that of the second projection 74b and further to have a projecting length longer than that of the second projection 74b. With this arrangement, the first projection 74a is made more flexible and more elastically deformable than the second projection 74b.

A stop pin 62 stands on the bottom wall of the base 10. The stop pin 62 is disposed at a position at which it can confront a first locking surface 57 of the stop latch 50 and can abut the first locking surface 57.

As shown in FIG. 7, when the HDD performs information processing, the head actuator 22 is pivoted to an information processing position and magnetic heads 40 perform information processing to a magnetic disk 16. At this time, since the magnetic attraction portion 58 is magnetically attracted by the magnet 49 of the VCM 24, the stop latch 50 of the latch mechanism 27 is pivoted clockwise around the pivot 53 and held at the illustrated release position at which the first locking surface 57a abuts the stop pin 62. At the release position, the latch claw 54 of the stop latch 50 is separated from the engaging claw 52 formed in the support frame 44 as well as being positioned away from the moving path of the engaging claw 52, and allows the head actuator 22 to perform a pivot operation.

When the head actuator 22 is pivoted from the information processing position to the retracted position at the time the operation of the HDD is stopped, the support frame 44 of the head actuator abuts the abutment portion 70 of the stop latch 50 and presses the engaging arm portion 56 as shown in FIG. 7. With this operation, the stop latch 50 is pivoted counterclockwise around the pivot 53 until the stop abutment portion 74 abuts the stop surface 72 as shown in FIG. 9. At this time, the first projection 74a abuts the stop surface 72 first and elastically deformed to thereby absorb a shock force as well relax collision noise and contact noise. When the head actuator 22 is further pivoted toward the retracted position, the second projection 74b abuts the stop surface 72 following the first projection 74a, thereby the shock force is further absorbed and the contact noise is further relaxed by the abutment operation performed twice. Since the wall thickness of the second projection 74b abutted at the second time is larger than that of the first projection 74a abutted at the first time, it is elastically deformed in an amount smaller than that of the first projection 74a so that it is not further flexed.

With this operation, the stop latch 50 is pivoted counterclockwise against the magnetic attraction force of the magnetic attraction portion 58 and moved to the illustrated latch position at which the stop abutment portion 74 abuts the stop surface 72. After the stop latch 50 abuts the stop surface 72, the elastically deformed first projection 74a returns to an original non-deformed state and slightly pivots the stop latch 50 and the head actuator 22. With this operation, the stop latch 50 is held at the latch position in the state that the first projection 74a abuts the stop surface 72 and the abutment portion 70 is in contact with the support frame 44. In the state that the stop latch 50 is held at the latch position, the latch claw 54 is positioned in the moving path of the engaging claw 52 and can latch the engaging claw 52 in the vicinity of the engaging claw 52 of the support frame 44.

When a large external force acts on the HDD and the head actuator 22 intends to abruptly pivot from the retracted position toward a direction in which the information processing is performed in the state that the head actuator 22 moves to the retracted position and the stop latch 50 is held at the latch position as described above, the engaging claw 52 of the support frame 44 is latched by the latch claw 54 of the stop latch 50 at the time the head actuator 22 slightly pivots. Accordingly, since the pivot operation of the head actuator 22 is regulated by the latch claw 54, the head actuator 22 is held at the retracted position.

In the second embodiment, since the other arrangement of the latch mechanism 27 and the other arrangement of the HDD are the same as those of the first embodiment described above, the same components are denoted by the same reference numerals and the detailed explanation thereof is omitted.

According to the HDD of the second embodiment arranged as described above, provision of the latch mechanism regulates the unintentional movement of the head actuator 22 even if an external force such as a shock acts on the HDD, thereby a disadvantage that the magnetic head is collided against the magnetic disk 16 and damaged can be prevented. Further, since the stop abutment portion 74 of the stop latch which abuts the stop surface 72 is composed of the first projection having low rigidity and the second projection having high rigidity, when the stop latch 50 abuts the stop surface 72, a shock can be absorbed and collision noise and contact noise can be suppressed. Accordingly, a user is not made concerned by shock noise and contact noise, thereby the reliability of the HDD can be improved.

Note that, in the second embodiment, it is sufficient that the first projection 74a of the stop latch 50 is less rigid than that of the second projection 74b, and the first projection 74a may be formed to have the same projecting length as the second projection 74b. Further, the first projection 74a may be formed to have a projecting length longer than that of the second projection 74b and to have the same wall thickness as that of the second projection 74b. Further, the first and second projections 74a, 74b may be formed of a material having a different hardness, for example, the first projection 74a may be formed of a material softer than that of the second projection 74b so that the first projection 74a is less rigid than the second projection 74b.

While certain embodiments of the inventions have been described, these embodiments have been presented by way of example only, and are not intended to limit the scope of the inventions. Indeed, the novel methods and systems described herein may be embodied in a variety of forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

In the HDD, the number of the magnetic disks is not limited to one sheet and may be increased when necessary. The present invention can be applied not only to a card type magnetic disk apparatus but also to a magnetic disk apparatus having a disk of other size. The first and second abutment portions in the stop latch may be formed in a shape other than the horn shape.

In the first and second embodiments described above, the stop latch is arranged such that the abutment portion thereof against the head actuator or the stop abutment portion thereof against the stop surface is formed of the first and second projections. However, as shown in FIG. 101 both the abutment portion and the stop abutment portion 74 which abut the head actuator may be formed of the first projections 70a, 74a and the second projections 70b, 74b, respectively. In this case, collision noise and contact noise can be more securely suppressed.

What is claimed is:

1. A disk drive apparatus comprising:
a case comprising a bottom wall;
a recording medium in the case;
a drive motor in the case, configured to support the recording medium and to rotate the recording medium;
a head configured to perform information processing to the recording medium;
a head actuator disposed on the bottom wall in the case, configured to support the head to be movable with respect to the recording medium, and to move between a predetermined retracted position where the head is located on an outer periphery side of the recording medium and to an information processing position where the head is located on the recording medium; and
a latch mechanism configured to latch the head actuator and to hold the head actuator at the retracted position if the head actuator receives an external force when the head actuator has moved to the retracted position,
the latch mechanism comprising a latch member configured to move between a latch position where the latch member is capable of latching the head actuator and a release position where the latch member is configured to release the latched head actuator, and the latch member comprises a contact portion, configured to touch the head actuator when the head actuator moves from the information processing position to the retracted position, and a latch claw configured to latch the head actuator, and
the contact portion comprising a first contact portion configured to contact the head actuator first, and a second contact portion configured to contact the head actuator second, and the first contact portion being formed less rigid than the second contact portion.

2. The disk drive apparatus of claim 1, wherein the first and second contact portions are formed of first and second projections extending from the latch member, respectively.

3. The disk drive apparatus of claim 2, wherein a thickness of the first projection is smaller than a thickness of the second projection, and the first projection is elastically deformed.

4. The disk drive apparatus of claim 2, wherein a length of the first projection is longer than a length of the second projection and the first projection is elastically deformable.

5. The disk drive apparatus of claim 2, wherein the first projection is formed of a material softer than a material of the second projection and the first projection is elastically deformable.

6. A disk drive apparatus comprising:
a case comprising a bottom wall;
a recording medium disposed in the case;
a drive motor disposed in the case, configured to support the recording medium and to rotate the recording medium;
a head configured to perform information processing to the recording medium;
a head actuator on the bottom wall in the case, configured to support the head to be movable with respect to the recording medium and to move between a predetermined retracted position where the head is located on an outer periphery side of the recording medium and an information processing position where the head is located on the recording medium; and
a latch mechanism configured to latch the head actuator and to hold the head actuator at the retracted position if the head actuator receives an external force when the head actuator moves to the retracted position,
the latch mechanism comprising a latch member configured to move between a latch position where the latch member is capable of latching the head actuator and a release position where the latch member is configured to release the latched head actuator, and the latch member comprises a contact portion configured to touch a stop when the head actuator moves from the release position to the latch position, and a latch claw configured to latch the head actuator, and
the contact portion comprising a first contact portion configured to touch the stop first when the head actuator moves from the release position to the latch position, and a second contact portion configured to touch the stop second, and the first contact portion being formed less rigid than the second contact portion.

7. The disk drive apparatus of claim 6, wherein the first and second contact portions are formed of first and second projections extending from the latch member, respectively.

8. The disk drive apparatus of claim 6, wherein a thickness of the first projection is smaller than a thickness of the second projection, and the first projection is elastically deformable.

9. The disk drive apparatus of claim 6, wherein a length of the first projection is longer than a length of the second projection and the first projection is elastically deformable.

10. The disk drive apparatus of claim 6, wherein the first projection is formed of a material softer than a material of the second projection and the first projection is elastically deformable.

* * * * *